United States Patent [19]
Stein et al.

[11] 4,043,188
[45] Aug. 23, 1977

[54] AIR FLOW METER FOR INTERNAL COMBUSTION ENGINE

[75] Inventors: Volkhard Stein, Stuttgart; Wolf Wessel, Oberriexingen, both of Germany

[73] Assignee: Robert Bosch GmbH, Stuttgart, Germany

[21] Appl. No.: 743,736

[22] Filed: Nov. 22, 1976

[30] Foreign Application Priority Data

Dec. 5, 1975  Germany .................................. 2554724

[51] Int. Cl.² .............................................. G01F 1/28
[52] U.S. Cl. ..................................... 73/116; 73/228
[58] Field of Search ........................ 73/198, 228, 116; 261/50 A; 123/139 AW; 277/53

[56] References Cited

U.S. PATENT DOCUMENTS

| 335,213 | 2/1886 | Brown | 73/228 |
| 3,974,813 | 8/1976 | Knapp et al. | 261/50 A X |

*Primary Examiner*—Jerry W. Myracle
*Attorney, Agent, or Firm*—Edwin E. Greigg

[57] ABSTRACT

The air flow rate meter in the induction tube of an internal combustion engine is a pivoting sector which has axial valve elements which cooperate with similar elements in the pivotal shaft to provide fuel metering in proportion to the excursion of the air flow rate meter due to the air flow. Parasitic leakage flow of air past the side walls of the pivoting sector is reduced by providing surface features, such as raised strips or fences, bored depressions, indentations and the like which cooperate with the induction tube wall which may have similar features to induce flow impedance and prevent unwanted air flow past the meter.

5 Claims, 7 Drawing Figures

AIR FLOW METER FOR INTERNAL COMBUSTION ENGINE

BACKGROUND OF THE INVENTION

The invention relates to an air flow rate meter for use in the fuel supply system of a mixture compressing externally ignited internal combustion engine. The air flow rate meter is disposed movably within the induction tube of the engine and is subject to a restoring force. Its displacement becomes a measure of the aspirated air quantity. In known fuel injection systems of this general type, the air quantity flowing through the induction tube is measured by an air flow rate meter and fuel is metered out proportional to the air quantity separately for each engine cylinder and is injected separately by individual injection valves in the vicinity of each cylinder. In such a construction, the lateral surfaces of the air flow element cooperate with the induction tube walls to provide a sealing function which prevents air flow in between the two surfaces into the induction tube region downstream of the flow meter. Such a leakage air flow would alter the downstream pressure and would result in an erroneous indication by the air flow rate meter. However, the clearance between the cooperating surfaces cannot be made arbitrarily small because vibrations and temperature changes, for example, could result in dimensional changes that would affect the operational reliability if the clearance between the two surfaces were too small.

OBJECT AND SUMMARY OF THE INVENTION

It is a principal object of the invention to provide an air flow metering element for a fuel injection system in which the leakage air flow alongside the lateral wall surfaces is minimized.

This object is attained according to the invention by providing those lateral surfaces of the air flow meter which face the induction tube wall, and the induction tube interior itself, with surface features that constitute a labyrinth type seal.

In a preferred and advantageous embodiment of the invention, the air flow element is a valve element having a radial cross section resembling a circular sector and extending throughout the diameter of the air induction tube. The labyrinth seal is provided by surface features, especially by fence-like bars extending radially and concentrically from the side walls of the rotary valve element.

According to another advantageous feature of the invention, the top sides of the fences or bars which face the induction tube walls are concave. Yet another advantageous embodiment of the invention provides a groove extending between two adjacent fences and connecting the groove with the induction tube downstream of the rotary valve element.

In another advantageous embodiment of the invention, the labyrinth seal is provided by bored depressions in the side walls of the valve element, separated by pathways.

The invention will be better understood as well as further objects and advantages thereof become more apparent from the ensuing detailed description of two exemplary embodiments taken in conjunction with the drawing.

DESCRIPTION OF THE PREFERRED EMBODIMENTS

Figure 1:
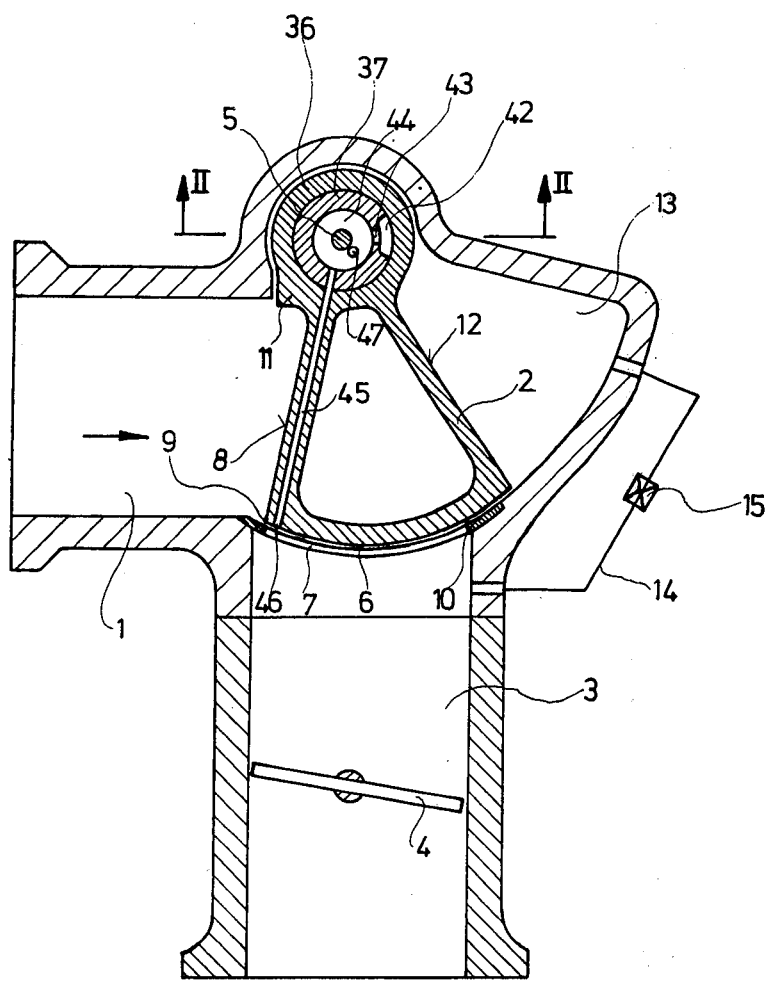
FIG. 1 is a cross section through a first exemplary embodiment of the fuel injection system along the line I—I of FIG. 2.

Turning now to FIG. 1, there is shown a fuel injection system with parts of an engine in which the air necessary for combustion flows in the direction of the arrow into a region 1 of the induction tube which encloses an air flow rate responsive element 2. The air then traverses a region 3 of the induction tube which encloses an arbitrarily settable throttle valve 4 and finally continues to one or several cylinders, not shown, of an internal combustion engine. The air flow element 2 is pivoted at one side about a transverse fixed shaft 5 and is embodied as a valve element which has the radial cross section of a circular sector and which completely traverses the inside diameter of the induction tube. The face 6 of the valve element 2 cooperates with and passes an aperture 7. It is advantageous, for reasons of weight and cost savings, if the valve element 2 is hollow.

The surface 8 of the valve element 2 facing the air stream has an edge 9 which controls the degree of opening in the aperture 7 in dependence on the aspirated air quantity. The aperture 7 is preferably disposed within a foil 10. The region 1 of the induction tube is entirely traversed with tight radial clearance by the valve element 2. A stop 11 limits the clockwise rotation of the valve element 2. The surface 12 of the valve element 2 remote from the air stream enters a damping chamber 13 which is coupled via a line 14, containing a throttle 15, with the induction tube region 3 downstream of the aperture 7. As a result, any pressure oscillations which are due to the suction strokes of the engine do not have any influence on the angular position of the valve element 2. The motion of the valve element 2 within the appropriately shaped air induction tube region 1 takes place in approximation to a linear fuction of the air flow rate in the induction tube. If the pressure ahead of the valve element 2 is constant, then the pressure between the valve element 2 and the throttle valve 4 is also constant.

Figure 2:
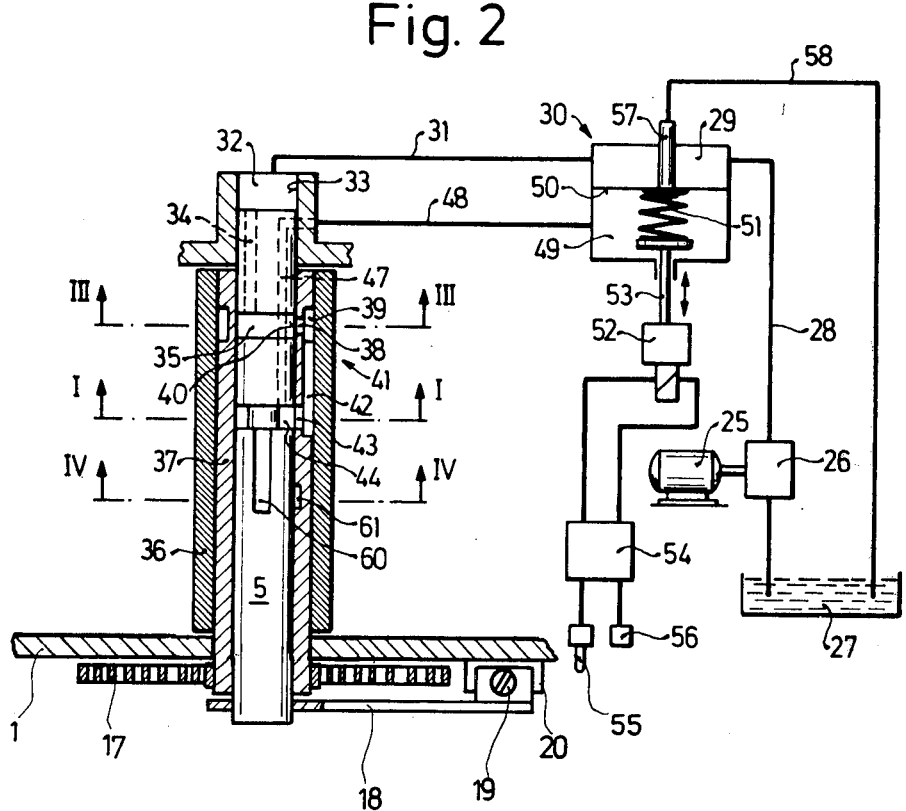
FIG. 2 is a section along the line II—II in FIG. 1.

Turning now to FIG. 2, it will be seen that fuel is supplied to the system by an electric motor 25 which drives a fuel pump 26 that aspirates fuel from a fuel container 27 and delivers it via a line 28 to a chamber 29 within a differential pressure valve 30. From the chamber 29, fuel flows through a line 31 into a chamber 32 which is defined by the end face of the bearing shaft 5 and its guide bore 33 in an extension of the induction tube wall. A bore 34, shown in broken lines in FIG. 2, establishes communication of the chamber 32 with a groove 35 worked into the bearing shaft 5. The valve element 2 is affixed on a sleeve 36 which is fixedly attached to a bushing 37 rotating on the bearing shaft 5.

Figure 3:
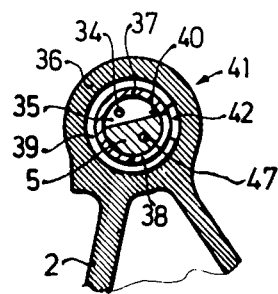
FIG. 3 is a section along the line III—III in FIG. 2.

The bushing 37 has a control slot 38 terminating in an annular groove 39. The control slot 38 cooperates with a control edge 40 (see FIG. 3) which is formed by the end surface of the groove 35 in the bearing shaft. Depending on the position of the valve element 2, the control edge 40 opens the control slot 38 to varying degrees for metering out a fuel quantity proportional to the aspirated air flow rate. Thus, the control edge 40 and the control slot 38 together form a fuel metering valve 41 within the bearing shaft 5 of the valve element 2. The metered fuel flows from the annular groove 39 through a groove 44 in the bearing shaft 5. The annular groove 44 communicates with a line 45 disposed within the face portion of the valve element 2 and the line 45 opens in the vicinity of the aperture-controlling edge 9, e.g., at the end face of the valve element 2, through an injection nozzle 46, into the portion of the passage 7 opened by the edge 9, as best seen in FIG. 1. In a variant embodiment, which is not illustrated, the line 45 terminate in several nozzles 46 located in the end surface of the valve element 2. As another variant, the injection nozzle 46 might be a slit extending nearly over the entire width of the end surface of the valve element 2. In yet another embodiment, not illustrated, the injection nozzle 46 might be a fuel injection valve.

Fuel is metered out at the metering valve 41 with constant pressure difference. For this purpose, the annular groove 44 communicates through a bore 47 and a line 48 with a chamber 49 in the differential pressure valve 30 which is separated by a diaphragm 50 from the chamber 29. The differential pressure valve 30 is urged to close by a spring 51 within the chamber 49. The force of the spring 51 may be changed in dependence on operational parameters of the engine. For this purpose, an electromagnet 52 may, for example, be employed, which engages the spring 51 via actuating pin 53, or, again, a supplementary force whose magnitude depends on engine variables may act directly on the diaphragm 50 in parallel with the spring 51. For example, the magnet 52 may be actuated by an electronic controller 54, in response to signals from an oxygen sensor 55 located in the exhaust line to measure the partial pressure of oxygen or from a temperature sensor 56. The force on the diaphragm 50 might also be made dependent on a bimetallic spring which engages the spring with a force depending on the engine temperature. The differential pressure valve 30 is embodied as a flat seat valve whose diaphragm 50 is its movable valve member which cooperates with a fixed valve seat 57 over which fuel may flow into a return line 58 which terminates in the fuel container 27. The differential pressure valve serves at the same time as a system pressure control valve. The excursion of the valve element 2 takes place in opposition to the force of a spiral spring 17, one end of which is connected to the bushing 37 while the other end is attached to a stop member on the air induction tube.

The basic setting of the fuel metering valve 41 may be adjusted by rotating the bearing shaft 5 with respect to the valve element 2 by means of a lever 18 and a screw 19 abutting a stop 20.

Figure 4:
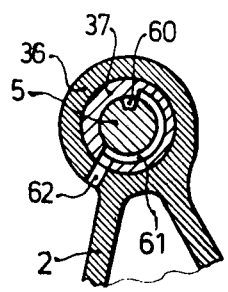
FIG. 4 is a section of the fuel injection system along the line IV—IV in FIG. 2.

A favorable feature of the invention is that the metered-out fuel is mixed with air prior to injection in the air induction tube. For this purpose, as shown more clearly in FIG. 4, the annular groove 44 communicates with an air hole 62 in the face 8 via a groove 60 and an annular groove 61. The air hole 62 leads to the interior of the air induction tube 1 upstream of the valve element 2. The annular groove 61 is peferably so embodied that it covers the groove 60 only when the engine runs at least at minimum idling rpm. This feature prevents the admission of an imcombustible fuel-air mixture during engine start-up. The same purpose could be achieved by placing the terminus of the injection nozzle 46 a small distance upstream of the edge 9 or by placing it so as to be very close to the induction tube wall. The admixture of air to the metered fuel prior to injection in the induction tube results in an improved mixture preparation.

The above-described fuel injection system according to the present invention operates as follows:

When the engine is running, the fuel pump 26 aspirates fuel from the container 27 and delivers it through the line 28 to the fuel metering valve assembly 41. At the same time, the engine aspirates air which flows through the induction tube 1 and the flow aperture 6. Depending on the displacement of the valve element 2, the control edge 9 more or less opens the aperture 7. Since the fuel metering valve 41 is controlled directly by the position of the valve element 2, the ratio of aspirated air and metered-out fuel is substantially constant. Furthermore, the fuel metering takes place at a pressure difference which is held constant by the differential pressure valve 30, while the closing force exerted on the diaphragm 50, especially by force of the spring 51 and, hence, the pressure difference, may be changed so as to adapt the fuel-air ratio to different operational conditions of the engine. The metered-out fuel is injected through the injection nozzle 46 located at the end face of the valve element 2 near the control edge 9, e.g., near a point where the air flow has its highest velocity, so as to obtain as homogeneous a fuel-air mixture as possible.

The fuel injection system according to the present invention provides the advantage that the location of the fuel metering assembly 41 in the bearing shaft 5 makes possible a very compact construction and, furthermore, since the fuel injection occurs through the end face of the valve element 2 near the control edge 9, all fuel lines may be made very short and a very good mixture integration is obtained. Yet another improvement of the fuel mixture preparation results from admixing air with the metered-out fuel prior to injection in the induction tube.

The air flow meter embodied as a rotating valve element offers the advantage of being very stable mechanically and relatively immune against high pressure surges, for example back-fires. Furthermore, the wettable surface area when closed is less than in a comparable air metering flap with a damper baffle. Another particular advantage is that the rotary valve element cooperates with an aperture in a foil that is easily exchanged so as to be adaptable to any particular type of engine.

Figure 5:
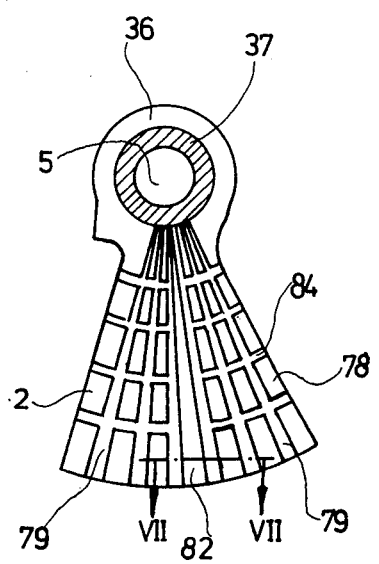
FIG. 5 illustrates a first exemplary embodiment of a rotary valve element having a labyrinth seal.
Figure 6:
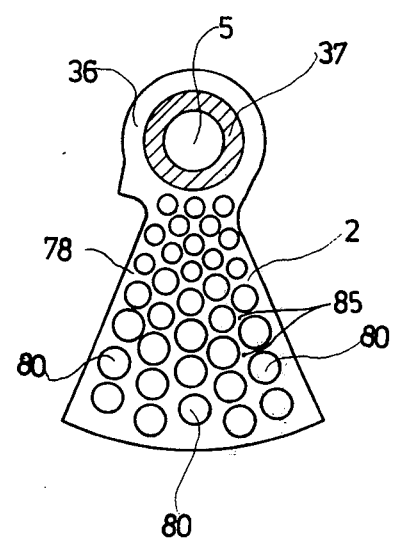
FIG. 6 illustrates a second exemplary embodiment of a rotary valve element having a labyrinth seal.

In order to improve the seal between the induction tube walls and the adjacent side walls of the valve element, it may be suitable to embody the side walls of the valve element or of the induction tube as labyrinth seals. As illustrated in FIG. 5, these may be formed by radial and concentric fences 79 and 84 disposed at the side walls of the valve element or, alternatively, they may be embodied as bores 80 which form a system of throttling locations, disposed in series, which tend to reduce the leakage of air to a substantial degree. The concentrically extending fences or strips 84 serve for the reduction of the leakage air flow in the radial direction.

Figure 7:
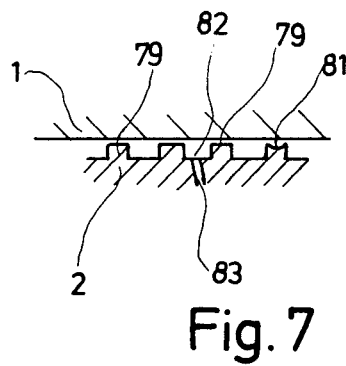
FIG. 7 is a section of the apparatus illustrated in FIG. 5 along the line VII—VII.

FIG. 7 is an enlarged illustration of a section of the side wall 78 of the valve element including the fences 79 used for additional sealing. The fences may have a rectangular cross section, or the faces adjacent the induction tube walls may be concave, as illustrated at numeral 81, or may be pointed. In order to reduce the pressure drop between the induction tube region 1 upstream of the valve element and the damping chamber, it might be suitable to provide a groove 82 between two fences 79 and to connect the groove 82 by a line 83 with the induction tube region 3 downstream of the valve element 2. Alternatively, and as not shown, the groove 82 and the line 83 can be disposed within the induction tube wall region passed by the valve element 2.

The foregoing relates to preferred exemplary embodiments of the invention, it being understood that other embodiments and variants are possible within the spirit and scope of the invention, the latter being defined by the appended claims.

What is claimed is:

1. In an air flow rate meter for use in association with the air induction tube of an internal combustion engine, said air flow rate meter being pivotably disposed in said air induction tube and subjectd to a restoring force in opposition to the force of the air flow, the improvement comprising:

providing portions of the surface of said air flow rate meter with static mechanical features to impede air flow between said surface and the inside wall surface of said induction tube to thereby serve as a labyrinth seal.

2. An air flow rate meter as defined by claim 1, including a pivoting valve assembly and having a cross section resembling a circular sector and extending substantially across the entire open area of said induction tube, wherein said labyrinth seal is composed of pathways extending radially from the pivot of said meter and intersecting with other pathways extending along circular arcs concentric with said pivot.

3. An air flow rate meter as defined by claim 2, wherein the surfaces of said pathways facing the induction tube wall are concave.

4. An air flow rate meter as defined by claim 2, further comprising a groove extending between two of said radial pathways, said groove communicating with an induction tube region lying downstream of said pivoting valve assembly.

5. An air flow rate meter as defined by claim 1, wherein said labyrinth seal is composed of depressions in the lateral surfaces of said meter and by pathways lying adjacent to and between said depressions.

* * * * *